No. 765,683. Patented July 26, 1904.

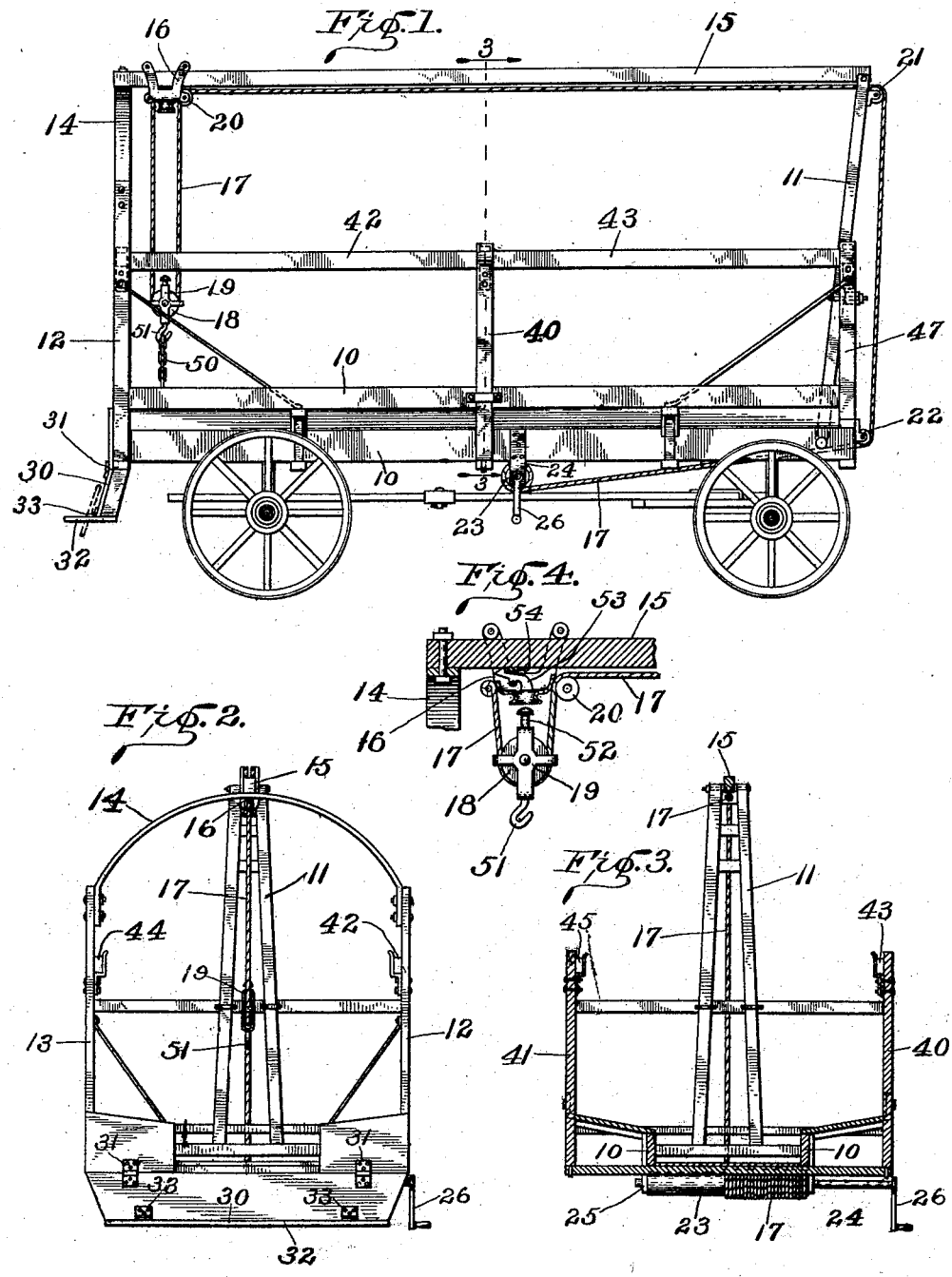

UNITED STATES PATENT OFFICE.

JAMES B. SCHUMAN, OF COLUMBIA CITY, INDIANA, ASSIGNOR OF ONE-HALF TO JOSEPH K. SHARPE, JR., OF INDIANAPOLIS, INDIANA.

CORN-SHOCK LOADER.

SPECIFICATION forming part of Letters Patent No. 765,683, dated July 26, 1904.

Application filed December 4, 1901. Serial No. 84,668. (No model.)

*To all whom it may concern:*

Be it known that I, JAMES B. SCHUMAN, a citizen of the United States, residing at Columbia City, in the county of Whitely and State of Indiana, have invented certain new and useful Improvements in Corn-Shock Racks and Loaders, of which the following is a specification.

Corn, as is well known, when harvested is bound in shocks which are large and heavy. Formerly it was the practice to break off the ears from the stalks after the corn had set in the shock for a suitable time and do the husking by hand. The stalks and leaves then became what is designated as "corn-fodder" and was generally handled by means of pitchforks in a manner similar to that in which hay and straw is commonly handled. In recent years the prevailing method of handling corn after it is harvested has materially changed, owing to the introduction of the machines known as "corn huskers and shredders." It has therefore become desirable to take the corn in the shock and transport it to such machines without breaking off the ears. This, owing to the size and weight of the shocks, it is not practical to do except by separating the shocks and handling a few stalks at a time. In doing this many of the ears become broken off and the stalks become mixed and interlaced in the wagon or rack onto which they are thrown, so that they are difficult of separation when it comes to the work of unloading them and delivering them to the husking and shredding machine. This work also frequently has to be done in cold disagreeable weather and sometimes when the shocks are covered with sleet and ice, which not only renders the work of separation difficult, but wets and rapidly wears the clothing of the persons doing the work as well as causing them great discomfort. Sometimes also the shocks become somewhat embedded in the soft dirt or mud after rains and also sometimes become frozen in place, so that heavy lifting is required to displace them.

It is the object of my invention to provide a vehicle for transporting the shocks of corn from the field to the husking and shredding machine which shall be provided with means for handling said shocks as a whole without separating them into parts and this with little or no actual contact of the person or the clothing of the operative therewith, as will be hereinafter more particularly described and claimed.

Referring to the accompanying drawings, which are made a part hereof, and on which similar reference characters indicate similar parts, Figure 1 is a side elevation of a vehicle suitable for the purpose and provided with or embodying the equipment constituting my invention; Fig. 2, a rear elevation thereof; Fig. 3, a transverse vertical sectional view as seen when looking in the direction indicated by the arrows in the dotted line 3 3 in Fig. 1, and Fig. 4 a detail sectional view of the traveling carrier and immediately adjacent parts.

The body or frame 10 is shown as the ordinary frame of a hay-rack, having a common boom-rack 11 at the front end and mounted on a common wagon running-gear. At the rear end of the frame 10 I set corner-posts 12 and 13, and at the tops of these posts I place a suitable cross-bar 14, this being shown in the form of a curved metal bar. From the cross-bar 14 to the top of the boom-rack 11 I run a track-bar 15, and upon this I mount the frame 16 of a traveling carrier. A rope 17 is connected to this frame and runs thence down to a suitable pulley-block (composed of a sheave 18 and a suitable frame 19) and thence over a sheave 20 on the traveling carrier-frame 16, thence along near the track 15 to and over a sheave 21 on the boom-rack 11, thence down and under a sheave 22 on the vehicle-frame 10, and thence to a winding drum or spool 23, mounted below said frame 10 at a suitable intermediate point, where it is carried in suitable bearings 24 and 25, (see especially Fig. 3,) attached to the frame 10. This winding drum or spool is provided with a crank-handle 26, by means of which it may be revolved and the rope 17 wound up, as will be readily understood.

At the rear of the vehicle and extending downwardly below its floor is a guard or slide board 30. The primary purpose of this is to form a way or surface over which the butts of the stalks of corn in the shock may be drawn, it being desirable to have such a way or surface extending down lower than the bottom or bed of the rack or wagon to insure that a flat surface shall come in contact with the stalks at a point below the ears thereon, thus avoiding very largely the danger of breaking off the ears as the shock is drawn into the rack or wagon. To the bottom of this board 30 (which is itself mounted on hinges 31, so as to be conveniently folded up when desired) I connect a suitable step 32 by means of hinges 33. This step, as best shown in Fig. 1, not only does not interfere with the operation of the board 30 as a way or slide surface, but in folding up against said board 30 operates (by reason of being hinged substantially in the center) to form an extension thereto, thus providing a wider surface way or one which extends nearer to the surface of the ground than the board 30 alone would do.

Two central posts 40 and 41 and side rails 42, 43, 44, and 45 serve to hold the corn-shocks in place when drawn into the vehicle. The rails are carried at the center by the posts 40, at the rear end by the posts 12 and 13, and at the front end by posts 47. The posts 12, 13, and 47 are preferably stiffened by suitable braces, as shown, which, however, are so arranged as not to interfere with loading or unloading. The several parts 40 to 45, inclusive, are removable, and therefore may be conveniently taken down for convenience in unloading the shocks or stalks of corn when removing the same from the rack or wagon to the husking and shredding machines or wherever they are to be deposited, or for any other purpose desired.

The operation of my apparatus is as follows: The rope 17 is unwound from the spool or drum 23 and the tackle-block 18 19 drawn out of the rear of the wagon and to a point adjacent to a shock of corn which it is proposed to load. A suitable chain or rope 50 (preferably a chain) is thrown around the shock and engaged with the hook 51 of the tackle-block. The rope is then wound up on the spool or drum by means of the crank-handle 26, drawing the shock of corn up into the wagon, raising it until the strike 52 on the tackle-block comes in contact with the pivoted latch 53 on the traveling carrier, throwing said latch out of engagement with the catch 54 on the track-bar 15, whereupon said traveling carrier (bearing the shock of corn) will be transported along the track 15 until it reaches the front end of the wagon or comes against previously-loaded shocks. The operative, who is in the wagon, then swings the shock into its exact place (generally standing it upright) and unhooks the chain and pushes the carrier back to its initial position, when it is ready for another operation. By the use of this apparatus, therefore, two men only are required—one on the wagon and one on the ground—and they are enabled to easily load the shocks by simply driving alongside the same, then attaching the tackle thereto, and pulling them into place by means of said tackle, as above described. The work is thus done with the expenditure of much less time and labor and with much greater comfort and convenience than where it has to be performed by hand, while the shocks are arranged in regular order in much more convenient position for unloading and further handling.

Having thus fully described my said invention, what I claim as new, and desire to secure by Letters Patent, is—

1. The combination, in a corn-shock rack and loader, of a suitable wagon-body, a framework embodying a track-rail mounted thereon, a traveling carrier mounted on said track-rail, a windlass for operating said carrier, a slide or way secured to the wagon-body at the end thereof where the corn-shocks are loaded, and a step hinged to the bottom of said slide or way the hinges whereof are attached to said step at a middle point whereby said step is caused to form a prolongation of said slide or way when folded up, substantially as set forth.

2. The combination, in a corn-shock rack and loader, of a suitable wagon-body, a framework mounted thereon, posts and rails forming part of said framework at the sides which are removable and replaceable, a track-rail mounted on the portions of said framework which extend upwardly at the ends, a traveling carrier mounted on said track-rail, a pulley-block, a windlass secured to the wagon-body at a point underneath the frame thereof, and a rope running from said windlass to the front of said wagon-body thence up to a point near the track-rail thence to the carrier thence to the pulley-block and back to the carrier, suitable sheaves being provided at the points of change of direction, substantially as shown and described.

3. The combination, in a corn-shock, rack and loader, of a suitable wagon-body, a framework embodying a track-rail supported medially above the wagon-bed and longitudinally thereof, a traveling carrier mounted on said track-rail and carrying a catch to automatically engage a stop carried by the track-rail near the rear end of the wagon, a pulley-block provided with means to automatically engage and release said catch, a cable secured at one end to the carrier passed around said pulley-block, from thence returned to the carrier through a suitable guide, from thence carried forward adjacent the track-rail to the forward end of the wagon-body and thence downward to a suitable windlass, the said windlass, a slide secured to the rear end of the body and extending downward therefrom to form a guide for the rising shocks, and removable side rails, all substantially as and for the purpose set forth.

In witness whereof I have hereunto set my hand and seal, at Indianapolis, Indiana, this 30th day of November, A. D. 1901.

JAMES B. SCHUMAN. [L. S.]

Witnesses:
CHESTER BRADFORD,
ALBERT F. ZEARING.